United States Patent Office 2,709,668
Patented May 31, 1955

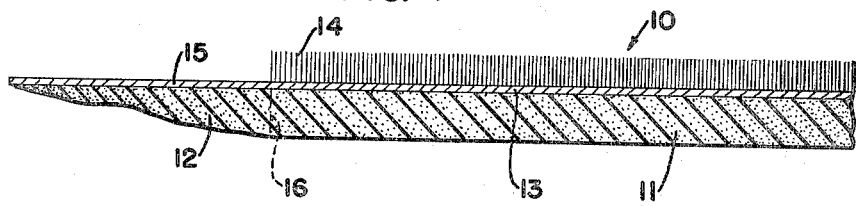
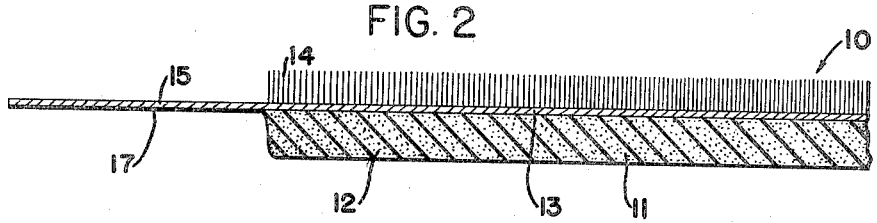
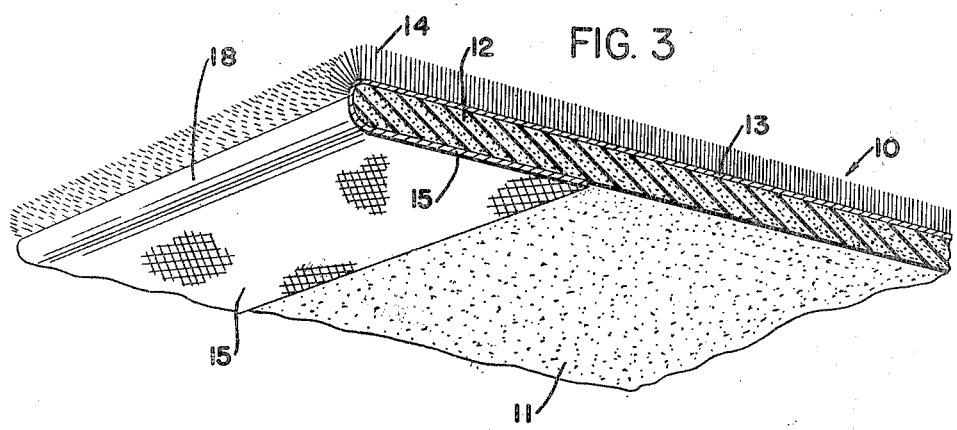

2,709,668

METHOD FOR FORMING SELVAGE EDGE FINISH ON LATEX FOAM COATED FABRIC MATERIALS

Robert D. Thompson, Akron, Ohio

Application January 25, 1954, Serial No. 406,025

4 Claims. (Cl. 154—117)

This invention relates to finished latex foam coated fabric materials, and to a method for forming a selvage edge finish on such materials.

In the manufacture of rugs, runners, carpeting, fatigue pads, stair pads, seat cushions, and similar articles, wherein fabrics coated with latex foam are utilized in the manufacture thereof, the composite material after it leaves the coating apparatus, has surplus fabric and foam extending along the side edges thereof. One example of an apparatus and process for producing such latex foam coated fabric materials is disclosed in Alderfer Patent No. 2,628,654, granted February 17, 1953.

Heretofore this surplus fabric and foam has been cut away as waste in order to provide clean cut side edges on the composite material, and one of the objects of this invention is to make use of this surplus fabric without cutting it away to thereby provide a selvage edge finish on each side of the composite material.

Another object is to provide latex foam coated fabric material having a selvage edge finish on both sides thereof.

A further object is to provide a method for forming a selvage edge finish on latex foam coated fabric material which provides a bound and reinforced edge at low cost and without undesirable bulk.

A further object is to provide a method for forming a selvage edge finish on latex foam coated fabric material wherein the surplus foam is first removed from the surplus fabric, then an adhesive is applied to the cleaned area of the surplus fabric, and thereafter the latter fabric is turned around the adjacent edge of the foam and adhered to the latter edge as well as to the opposite side of the foam.

Other objects and advantages will become apparent from the following description taken in conjunction with the accompanying drawing.

In the drawing:

Fig. 1 is an enlarged cross-section of a portion of latex foam coated pile fabric material showing one side edge thereof, and in which the size of the pores and cells of the foam and the size of the pile is exaggerated, Fig. 2 is a similar view showing the surplus foam removed from the surplus fabric, with the lower surface of the latter being covered with an adhesive, and Fig. 3 is an enlarged perspective view of a portion of the finished material with the surplus fabric adhered to the lower surface of the foam and forming a selvage edge finish on the composite material.

Referring to Fig. 1 of the drawing, the numeral 10 designates, in its entirety, a latex foam coated fabric product which may have been made by the apparatus and process disclosed in said Alderfer Patent No. 2,628,654, or which may have been made in any other suitable manner which provides surplus foam and fabric along the side edges of the product. Since both side edges are similar, only one is shown and referred to herein.

The product 10 comprises a layer of latex foam 11 of uniform gauge or thickness throughout its main portion, while the side portions 12 of the foam have a "flow-off" gradual reduction in gauge, said side portions constituting surplus foam which is cut away as waste. Attached to the foam layer 11, preferably but not necessarily, by the method of said Alderfer patent, is a sheet of textile fabric 13, which in this instance has pile 14 on its outer surface. Side portions 15 of the fabric 13 extend beyond the sides of the pile 14 and constitute selvage or surplus fabric which was previously cut away with the surplus foam 12 to provide clean cut side edges at about the location indicated by the dotted line 16.

While the latex foam 11 usually will be prepared from natural rubber latex, any synthetic or other substitute therefor may be employed. Where the term latex foam is employed in the specification and claims, it is intended that equivalent material which can be foamed in a manner similar to rubber latex, and having similar properties, is intended to be included thereby.

Likewise, the fabric 13, which in this instance is a pile fabric, may be any type of textile fabric, such as muslin, duck, drilling, nylon or other artificial plastic fabrics, silk, burlap, or any woven or knitted fabric suitable for the purpose.

To provide the product of the present invention, first the surplus portions 12 of the foam are removed from the surplus fabric 15, as indicated in Fig. 2, or at least as much is removed as may be required to provide cleaned fabric for forming the turned edges to which reference will later be made. The removal of the surplus foam may be accomplished by buffing, scraping, stripping, or otherwise. The use of rotary wire brushes, rotary stones and hexagonal beaters has been successful in performing this step of the method.

Next, a coat of adhesive 17 (Fig. 2) is applied to the cleaned surfaces of surplus fabric 15, substantially coextensive with such surfaces. This adhesive may be of any type compatible with latex foam, such as latex and latex base adhesives, aqueous dispersions of rubber and reclaimed rubber, etc. Also, uncompounded latex may be used as an adhesive, since the migration of vulcanizing ingredients in the foam, to which the surplus fabric is to be adhered, will vulcanize the uncompounded latex to form a good bond. Any suitable type of edge coater may be used for applying the adhesive, or it may be applied with brushes, spray guns, etc.

After the adhesive is tacky enough to adhere to the foam 11, the selvage or surplus fabric 15 is turned around the adjacent edge of the foam 11 and tightly adhered to said edge and to the lower surface of foam 11, as indicated in Fig. 3, to provide a selvage edge finish 18 on the sides of the product. This turning of the fabric may be done by hand, but may also be done by using turning "throats" such as are used as attachments to sewing machines.

It is believed to be apparent that a novel method has thus been provided for securing a selvage edge finish on latex foam coated fabric material, which method provides a satisfactory product having bound and reinforced side edges without undesirable bulk.

While I have shown and described the preferred product and method of my invention, it will be apparent that the invention is not so limited, but that modifications and changes may be made therein within the spirit of the invention and within the scope of the subjoined claims.

What is claimed is:

1. A method for forming a selvage edge finish on latex foam coated fabric material when said material has surplus foam and fabric extending from a side thereof, which comprises removing the surplus foam from the surplus fabric to provide a clean surface on said surplus fabric, coating said clean surface with an adhesive, and then adhering said surface to said foam so as to cover the adjacent edge of said foam with said surplus fabric.

2. A method for forming a selvage edge finish on latex foam coated fabric material when said material has surplus foam and fabric extending from a side thereof, which comprises removing the surplus foam from the surplus fabric to provide a clean surface on one face of the latter, coating said clean surface with an adhesive, and then turning said coated fabric around the adjacent edge of said foam and into adhering engagement with said latter edge and with an opposite surface of said foam.

3. A method for forming a selvage edge finish on a composite material consisting of a layer of latex foam having a layer of fabric attached to one surface of the foam and with surplus foam and fabric extending from a side of the composite material, which method comprises removing the surplus foam from the surplus fabric to provide a clean surface on the latter, coating said clean surface with an adhesive, and then turning said coated fabric around the adjacent edge of said foam to bring said coated surface into adhering engagement with said latter edge and with the opposite surface of said foam.

4. In the method for forming a selvage edge finish on a composite material having a layer of latex foam with a layer of fabric attached to one surface of the foam and with surplus foam and fabric extending from a side of the composite material, the steps of removing the surplus foam from the surplus fabric, then coating one surface of said surplus fabric with an adhesive, and then turning said surplus fabric around the adjacent edge of said foam to bring said coated surface into adhering engagement with said latter edge and with the opposite surface of said foam.

References Cited in the file of this patent

UNITED STATES PATENTS

| | | |
|---|---|---|
| 1,859,922 | Holland | May 24, 1932 |
| 2,016,876 | Stolzenberg | Oct. 8, 1935 |
| 2,104,941 | Baynton et al. | Jan. 11, 1938 |